US011121606B2

(12) United States Patent
Li et al.

(10) Patent No.: US 11,121,606 B2
(45) Date of Patent: Sep. 14, 2021

(54) MOTOR, CIRCUIT BOARD, AND ENGINE COOLING MODULE INCLUDING THE MOTOR

(71) Applicant: Johnson Electric S.A., Murten (CH)

(72) Inventors: Yue Li, Hong Kong (CN); Youqing Xiang, Shenzhen (CN); Xiaojun Yan, Shenzhen (CN); Nan Zheng, Shenzhen (CN); Minghua Xiong, Shenzhen (CN); Yun Chen, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 460 days.

(21) Appl. No.: 15/980,726

(22) Filed: May 15, 2018

(65) Prior Publication Data

US 2018/0337578 A1     Nov. 22, 2018

(30) Foreign Application Priority Data

May 17, 2017   (CN) .......................... 201710349305.7

(51) Int. Cl.
| | |
|---|---|
| *H02K 11/33* | (2016.01) |
| *H02K 9/22* | (2006.01) |
| *H02K 11/30* | (2016.01) |
| *H02K 1/27* | (2006.01) |

(52) U.S. Cl.
CPC ............ *H02K 9/22* (2013.01); *H02K 1/2786* (2013.01); *H02K 11/30* (2016.01); *H02K 11/33* (2016.01)

(58) Field of Classification Search
CPC .. H05K 1/02; H05K 1/0204; H05K 2201/066; H05K 2201/012; H05K 1/18; H05K 1/181; F01P 5/04; F01P 2005/046; F04D 25/068; F04D 25/0606; F04D 25/06; F04D 29/58; F04D 29/5813; H02K 5/225; H02K 7/003; H02K 7/14; H02K 1/12; H02K 1/27; H02K 5/04; H02K 7/00; H02K 1/2786; H02K 9/00; H02K 9/22; H02K 11/33

See application file for complete search history.

(56) References Cited

U.S. PATENT DOCUMENTS

| | | | |
|---|---|---|---|
| 9,860,990 B1* | 1/2018 | Lee ......................... | H05K 1/021 |
| 2013/0300264 A1* | 11/2013 | Fujimoto ................. | H02K 5/22 |
| | | | 310/68 D |
| 2014/0301042 A1* | 10/2014 | Stella ................. | H05K 13/0465 |
| | | | 361/709 |
| 2018/0288907 A1* | 10/2018 | Richards ................. | H01L 23/36 |
| 2018/0352646 A1* | 12/2018 | Yu ......................... | H05K 1/0306 |

FOREIGN PATENT DOCUMENTS

JP              06157171 A   *   6/1994

* cited by examiner

*Primary Examiner* — Naishadh N Desai
(74) *Attorney, Agent, or Firm* — Millman IP Inc.

(57) ABSTRACT

The present disclosure relates to a motor, a circuit board and an engine cooling module including the motor. The motor includes a stator, the stator includes a control module and a heat sink, the control module includes a circuit board and a plurality of heat generating electronic components mounted on a top surface of the circuit board, a plurality of ceramic heat conducting members is embedded inside the circuit board at positions facing the heat generating electronic components, and the heat sink is attached on a bottom surface of the circuit board. The motor has improved heat dissipation effect.

10 Claims, 6 Drawing Sheets

MOTOR, CIRCUIT BOARD, AND ENGINE COOLING MODULE INCLUDING THE MOTOR

CROSS REFERENCE TO RELATED APPLICATIONS

This non-provisional patent application claims priority under 35 U.S.C. § 119(a) from Patent Application No. 201710349305.7 filed in The People's Republic of China on May 17, 2017.

FIELD OF THE INVENTION

The present disclosure relates to electric motors, and in particular to a motor, a circuit board and a cooling module of a car engine including the motor.

BACKGROUND OF THE INVENTION

The control circuit of a motor often includes a power control circuit and a signal control circuit. The power control circuit is configured for controlling on-off of current flow so as to control the stopping and running of the motor. The signal control circuit is configured for controlling the operation or feeding back other information of the motor. In the conventional technology, the power control circuit and the signal control circuit are usually arranged on different circuit boards, which increases the cost of the motor.

Especially, a motor of an engine cooling module, has to work in a hot environment, therefore, the circuit board of the motor is often made of fire retardant material, however, the fire retardant material has the advantages of non-flammable, but also has the disadvantage of poor thermal conductivity.

SUMMARY OF THE INVENTION

Hence there is a desire for a new motor having improved heat dissipation effect.

Accordingly, in one aspect thereof, the present disclosure provides a motor including a control module and a heat sink. The control module includes a circuit board and a plurality of heat generating electronic components mounted on a top surface of the circuit board. A plurality of ceramic heat conducting members is embedded inside the circuit board at positions facing the plurality of heat generating electronic components, and the heat sink is attached on a bottom surface of the circuit board.

Preferably, the ceramic heat conducting member is a sintered aluminum nitride ceramic block.

Preferably, the ceramic heat conducting member penetrates the top surface and the bottom surface of the circuit board.

Preferably, a first conductive layer is disposed on a top surface of the ceramic heat conducting member, and is electrically connected to the heat generating electronic component.

Preferably, a second conductive layer is disposed on a bottom surface of the ceramic heat conducting member facing the heat sink, and the heat sink is soldered to the second conductive layer.

Preferably, the substrate of the circuit board is made of an FR-4 grade material, and the ceramic heat conducting member is embedded in the substrate.

Preferably, the control module of the motor is mounted on only one circuit board, and the circuit board has a power control circuit module and a signal control circuit module.

Preferably, the stator includes a stator seat, the stator seat comprises an upper case and a supporting seat for supporting the stator core, the upper case and the heat sink are snap-fitted together and defining a receiving space therebetween for receiving the control module, and the supporting seat is mounted on the upper case.

Preferably, the motor is an outer rotor permanent magnet motor, the stator includes a stator seat, a stator core mounted to the stator seat, stator windings wound around the stator core. The rotor includes a rotating shaft rotatably mounted to the stator seat, a rotor housing having a cup shape fixed to the rotating shaft, and permanent magnets fixed to an inner wall of the rotor housing. An annular side wall of the rotor housing surrounds the stator core, and the permanent magnets are mounted to the inner surface of the annular side wall.

In another aspect thereof, the present disclosure provides an engine cooling module including a motor, a frame and an impeller. The motor is mounted to the frame for driving the impeller and includes a control module and a heat sink. The control module includes a circuit board and a plurality of heat generating electronic components mounted on a top surface of the circuit board. A plurality of ceramic heat conducting members is embedded inside the circuit board at positions facing the plurality of heat generating electronic components, and the heat sink is attached on a bottom surface of the circuit board.

Preferably, the ceramic heat conducting member is a sintered aluminum nitride ceramic block.

Preferably, the ceramic heat conducting member penetrates the top surface and the bottom surface of the circuit board.

In another aspect thereof, the present disclosure provides a circuit board including a substrate and a plurality of heat generating electronic components mounted on the substrate. The substrate includes a top surface and a bottom surface, the plurality of heat generating electronic components is mounted on the top surface of the substrate. A plurality of ceramic heat conducting member is embedded inside the circuit board at positions facing the plurality of heat generating electronic components, the ceramic heat conducting member penetrates the substrate. A conductive layer is disposed on an end surface of the ceramic heat conducting member toward the plurality of heat generating electronic components, and the conductive layer is electrically connected to the plurality of heat generating electronic components.

Preferably, the ceramic heat conducting member penetrates the top surface and the bottom surface of the substrate.

The present disclosure improves the heat dissipation effect of the circuit board, so that the heat dissipation effect of the motor can be improved.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Embodiments of the present disclosure will be described in greater detail with reference to the drawings. It should be noted that the figures are illustrative rather than limiting. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art.

Figure 1:
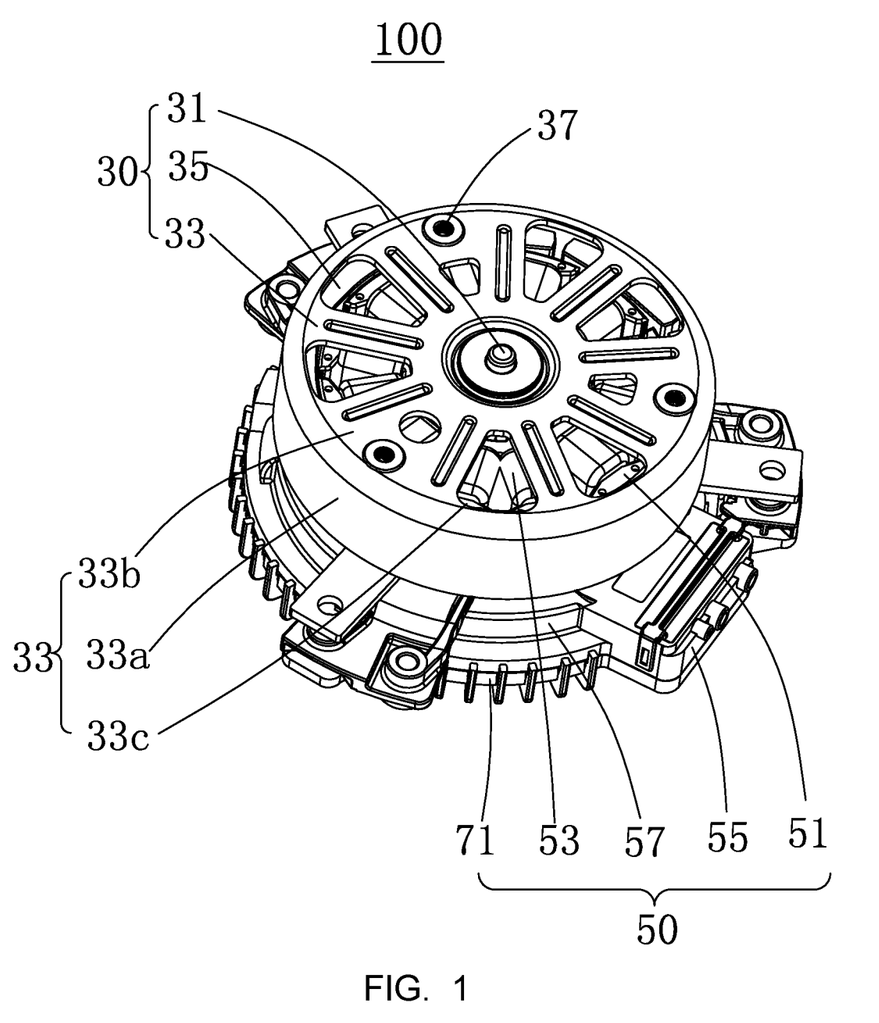
FIG. 1 is a schematic diagram of a motor according to an embodiment of the present disclosure.

Referring to FIG. 1, a motor 100 in accordance with an embodiment of the present disclosure is a permanent magnet brushless outer rotor motor, which includes a rotor 30 and a stator 50.

The stator 50 includes a stator core 51 made of magnetic material, stator windings 53 wound around the stator core 51, a connector 55 for supplying power to the stator windings 53, a stator seat 57 for supporting the stator core 51, a heat sink 71 mounted to the stator seat 57, and a control module. The heat sink 71 is made of metal heat conductive material such as copper or aluminum. The connector 55 is mounted to the stator seat 57 for connection to an external power source (not shown).

The rotor 30 includes a rotating shaft 31, a rotor housing 33 having a cup shape fixed to the rotating shaft 31, and a plurality of permanent magnets 35 mounted on an inner wall of the rotor housing 33. The rotor housing 33 includes an annular side wall 33a and a bottom portion 33b located at an axial end of the annular side wall 33a. The bottom portion 33b is fixed to the rotating shaft 31 so as to rotate with the rotating shaft 31. The annular side wall 33a surrounds and rotates around the shaft 31. The permanent magnet 35 is attached to an inner circumferential surface of the annular side wall 33a. In this embodiment, a plurality of substantially fan-shaped through holes 33c is defined in the bottom portion 33b and distributed around the rotating shaft 31, so that outside air can enter the interior of the motor 100 to cool the stator core 51 and the stator windings 53 to improve cooling effect of the motor 100. The bottom portion 33b of the rotor housing 33 forms a plurality of mounting positions 37 for fixedly mounting the rotor 30 to an impeller 220 (see FIG. 8) so that the rotor 30 can drive the impeller to rotate.

Figure 2:
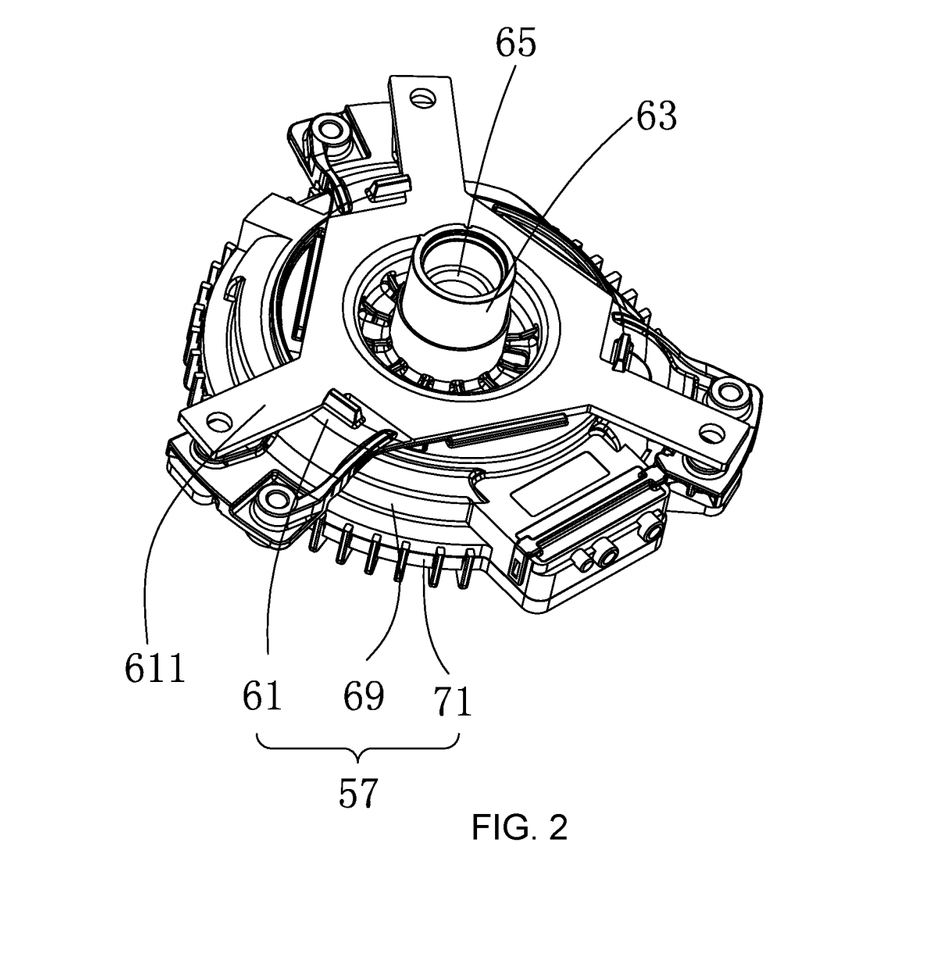
FIG. 2 shows the internal structure of the motor of FIG. 1.

Referring to FIG. 2, the rotation shaft 31 is rotatably mounted to the stator seat 57 through two bearings 32. The stator seat 57 includes a cylindrical supporting column 63. Two bearing positions 65 are formed in the supporting column 63 for mounting corresponding bearings 32. In this manner, the rotor 31 can rotate relative to the stator seat 57.

The stator core 51 includes an annular yoke portion 51a, and a plurality of stator teeth 51b extending outwardly from the annular yoke portion 51a. The stator windings 53 are wound around the stator teeth 51b. The stator core 51 and stator windings 53 are fixedly mounted to the stator seat 57.

The stator seat 57 includes an upper case 69 and a supporting seat 61 mounted to the upper case 69. The upper case 69 and the heat sink 71 are snap-fitted together and defining a receiving space therebetween for receiving the control module therein. The supporting seat 61 includes three mounting feet spaced apart in the circumferential direction for mounting to an external device and the supporting column 63 for supporting the stator core 51. A spacer 611 is disposed between the supporting seat 61 and the stator core 51. The spacer 611 is mounted to the supporting seat 61 for isolating the stator windings 53 from the support base 61. The shape of the spacer 611 is matched with the supporting seat 61.

Figure 3:
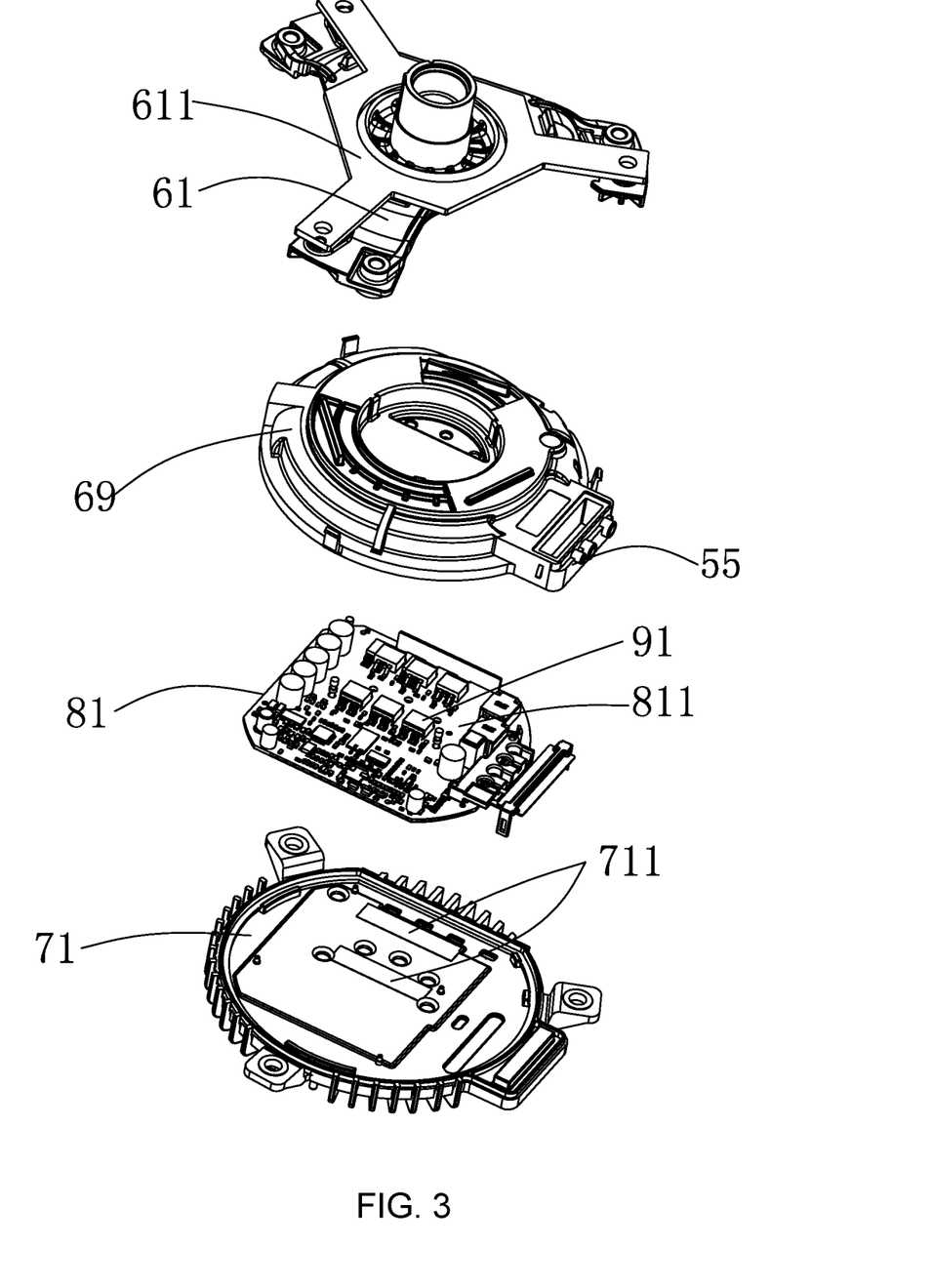
FIG. 3 is an exploded schematic view of a stator seat of the motor of FIG. 1.
Figure 4:
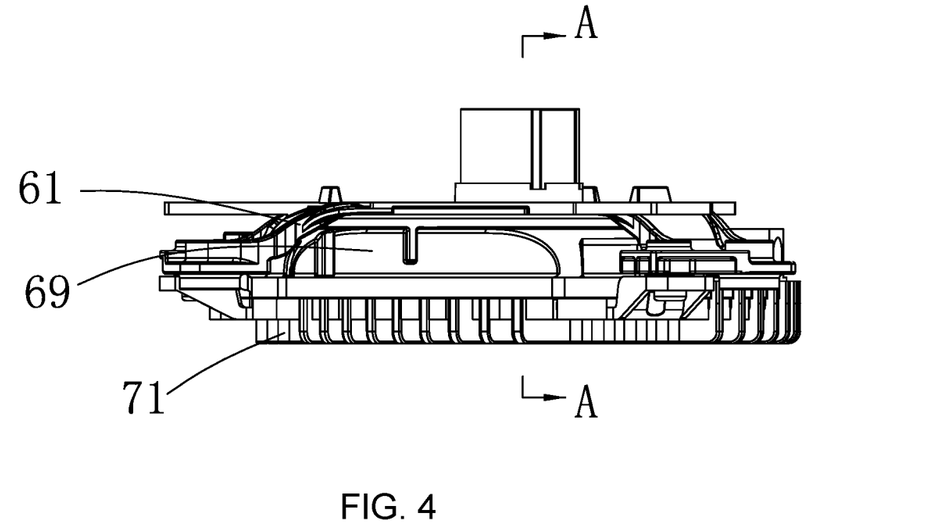
FIG. 4 is a schematic side view of the stator seat of the motor of FIG. 1.
Figure 5:
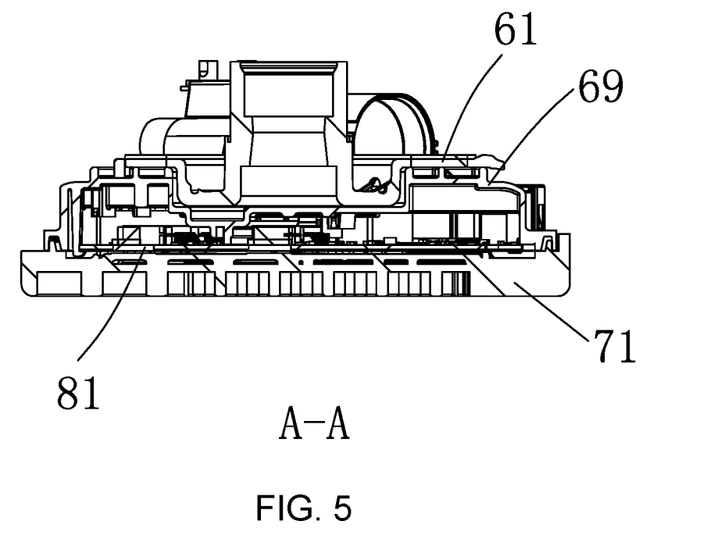
FIG. 5 is a longitudinal sectional view of the stator seat along the line A-A of FIG. 4.

Referring to FIGS. 3-5, in this embodiment, the control module includes a circuit board 81 and a plurality of heat generating electronic components 91 mounted on the circuit board 81. The upper case 69 and the heat sink 71 are clasped together and a receiving space is formed therebetween for receiving the circuit board 81 and the plurality of heat generating electronic components 91. The connector 55 is attached to the circuit board 81 to be electrically connected with the heat generating electronic components 91. The circuit board 81 includes a substrate 811. The substrate 811 includes a top surface and a bottom surface. The heat generating electronic components 91 are mounted on the top surface of the substrate 811. The heat sink 71 is located under the bottom surface of the substrate 811. The substrate 811 is made of fire retardant material, for example, FR4 material.

Figure 6:
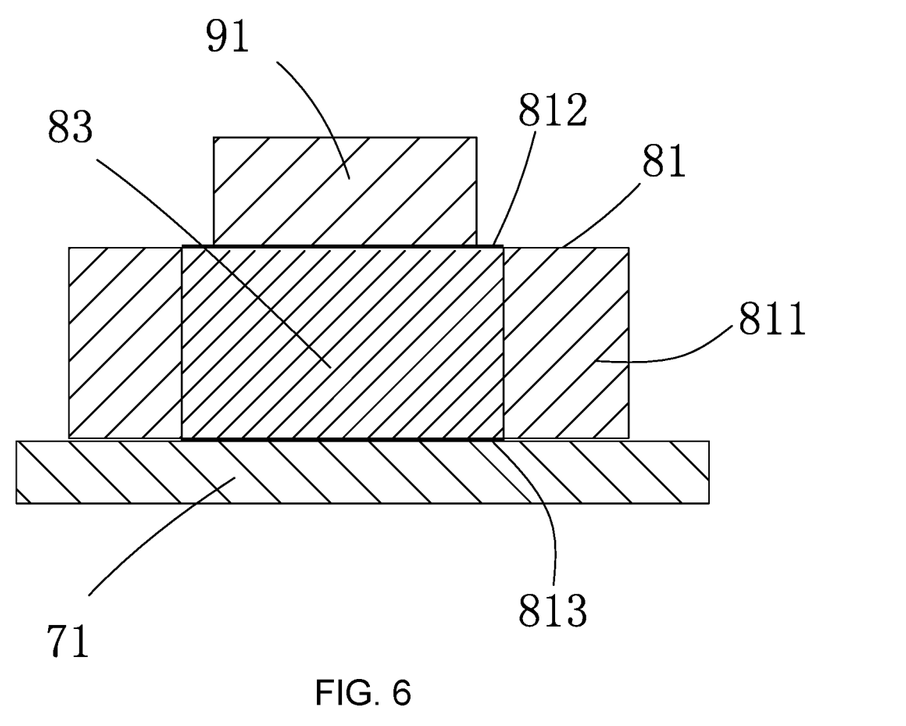
FIG. 6 is a schematic cross-sectional view of a circuit board and a heat sink of the motor of FIG. 1.

Referring to FIG. 6, the heat generating electronic components 91, such as metal-oxide semiconductor field-effect transistors (MOSFETs), are soldered on the top surface of the substrate 811. It can be understood that when the heat generating electronic components 91 are working, heat is generated therein, and the heat generating electronic components 91 becomes a heat source.

In order to improve the heat dissipation effect of the circuit board 81, a plurality of heat conducting members which is made of ceramic material is embedded in the substrate 811 of the circuit board 81 for heat exchangers. In the present embodiment, the heat conducting member is an aluminum nitride ceramic block 83. The aluminum nitride ceramic block 83 is thermally conductive, but electrically non-conductive. The aluminum nitride ceramic block 83 extends along the thickness direction of the circuit board 81. Preferably, the aluminum nitride ceramic block 83 penetrates the top and bottom surfaces of the circuit board 81 for rapidly transferring the heat generated by the heat generating electronic components 91 from the top surface to the bottom surface of the circuit board 81. The heat is further dissipated through the heat sink 71. The embedded heat conducting members can effectively improve the heat dissipation effect of the circuit board 81 along its thickness. Preferably, the position of the aluminum nitride ceramic block 83 is facing the position of the heat generating electronic component 91, and a first conductive layer 812 and a second conductive layer 813 are respectively disposed on both end surfaces of the aluminum nitride ceramic block 83. The first conductive layer 812 faces the heat generating electronic component 91, and the second conductive layer 813 faces the heat sink 71. One thermal conductive pad of the heat generating electronic component 91 is electrically connected to the first conductive layer 812. For example, a thermal pad of the MOSFET may be directly soldered to the first conductive layer 812, so that the heat generated by the MOSFET can be quickly transferred to the aluminum nitride ceramic block 83. More preferably, the area of the aluminum nitride ceramic block 83 facing the heat generating electronic component 91 is larger than the area of the heat generating electronic component 91 so as to absorb and transfer as much heat as possible from the heat generating electronic component 91. Preferably, a MOSFET can be provided with an aluminum nitride ceramic block 83. It is understood that, if the heat-conducting pads of multiple MOSFETs are connected together, the multiple MOSFETs can share one aluminum nitride ceramic block 83. The heat sink 71 is soldered to the second conductive layer 813 to fix the circuit board 81 and the heat sink 71 together. At least one soldering positions 711 (see FIG. 3) are formed on the heat sink 71 for soldering the heat sink 71 to the second conductive layer 813. Preferably, the materials of the first conductive layer 812 and the second conductive layer 813 are the same, such as copper foil, solder paste, copper paste and the like.

Preferably, the motor 100 has only one circuit board 81, and the power control circuit and signal control circuit are integrated in the circuit board 81, which can help reduce the complexity, cost, and size of the motor. Correspondingly, the connector 55 at least includes a terminal connected to the external power source and a terminal connected to a signal source.

Figure 7:
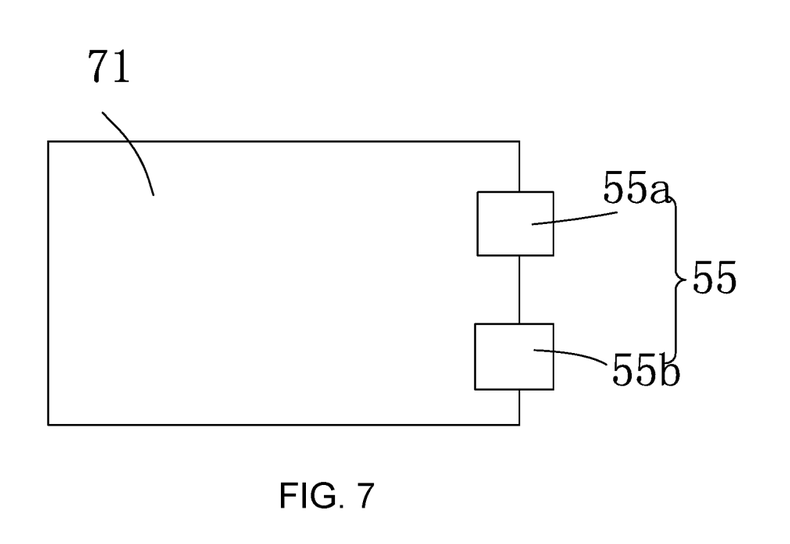
FIG. 7 is a schematic view of a circuit board and a connector used in a motor according to another embodiment of the present invention.

Referring to FIG. 7, alternatively, the circuit board 81 may include two connectors, one of which is a power connector 55a, the other is a signal connector 55b.

Figure 8:
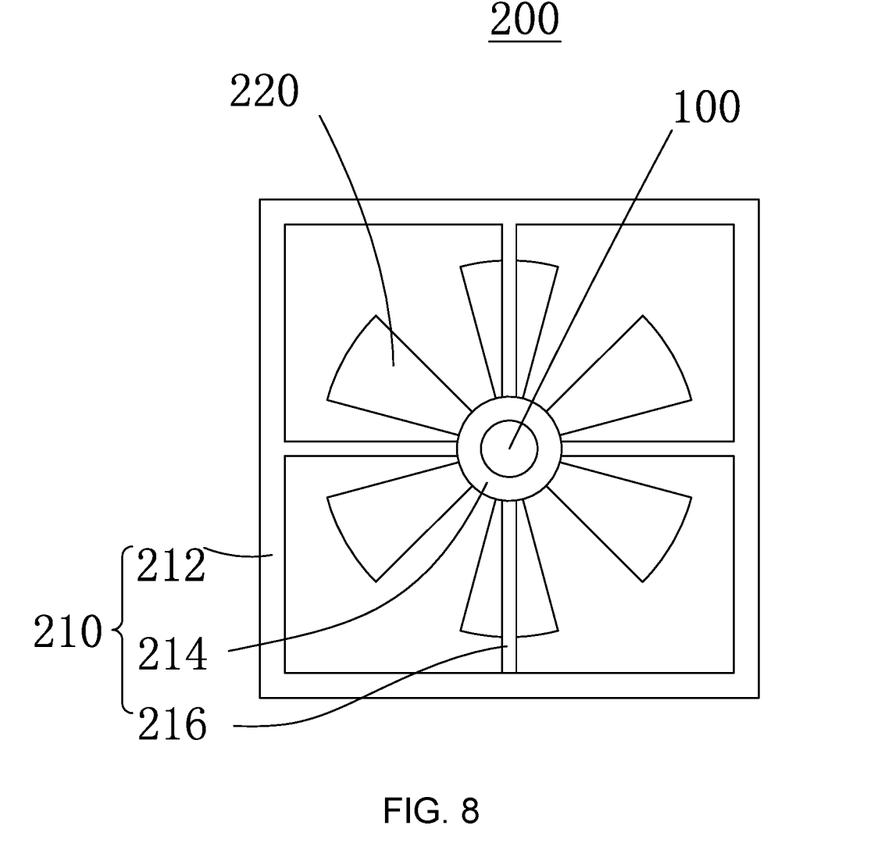
FIG. 8 is a schematic diagram of a cooling module of a car engine according to another embodiment of the present disclosure.

Referring to FIG. 8, a cooling module 200 of a car engine according to another embodiment of the present disclosure is shown. The cooling module 200 includes a frame 210, an impeller 220, and the motor 100. The frame 210 includes a rectangular or circular outer frame 212, an inner frame 214 disposed at the center of the outer frame 212, and a plurality of supporting portions 216 connected between the outer frame 212 and the inner frame 214. The motor 100 is mounted to the inner frame 214 and configured to drive the impeller 220. Due to the cooling module 200 including the motor 100, the cooling module 200 has good heat dissipation performance, good cooling effect, and long cycle life.

Referring to FIG. 6, a circuit board 81 according to an embodiment of the present disclosure is shown. The circuit board 81 includes a substrate 811, and a plurality of heat generating electronic components 91 mounted on the substrate 811. The substrate 811 includes a top surface and a bottom surface. The heat generating electronic components 91 are mounted on the top surface of the substrate 811. A heat sink 71 is located under the bottom surface of the substrate 811. A plurality of ceramic heat conducting member 83 is embedded inside the substrate 811 at positions facing the heat generating electronic components 91. The ceramic heat conducting member 83 extends through the substrate 811, a first conductive layer 812 is attached to an end surface (top surface) of the ceramic heat conducting member 83 which is facing the heat generating electronic component 91, and is conductively connected to the heat generating electronic component 91. Another end surface (bottom surface) of the ceramic heat conducting member 83 thermally but non-electrically contacts the heat sink 71. The circuit board 81 rapidly transfers the heat generated by the heat generating electronic components 91 to the bottom surface of the substrate 811 through the ceramic heat conducting member 83 and dissipates the heat through the heat sink 71, such that the circuit board 81 has good heat dissipation effect, and high safety and long cycle life.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by the appended claims.

The invention claimed is:

1. A motor comprising a stator, the stator comprising a control module and a heat sink, the control module comprising a circuit board and a plurality of heat generating electronic components mounted on a top surface of the circuit board, wherein a plurality of ceramic heat conducting members is embedded inside the circuit board at positions facing the plurality of heat generating electronic components, and the heat sink is attached on a bottom surface of the circuit board, a first conductive layer is disposed on a bottom surface of the ceramic heat conducting member, and the heat sink is soldered to the first conductive layer.

2. The motor according to claim 1, wherein the ceramic heat conducting member is a sintered aluminum nitride ceramic block.

3. The motor according to claim 1, wherein the ceramic heat conducting member penetrates the top surface and the bottom surface of the circuit board.

4. The motor according to claim 1, wherein a second conductive layer is disposed on a top surface of the ceramic heat conducting member, and is electrically connected to the heat generating electronic component.

5. The motor according to claim 1, wherein a substrate of the circuit board is made of an FR-4 grade material, and the ceramic heat conducting member is embedded in the substrate.

6. The motor according to claim 1, wherein the control module of the motor is mounted on only one circuit board, and the circuit board has a power control circuit module and a signal control circuit module.

7. The motor according to claim 1, wherein the stator comprises a stator seat, the stator seat comprises an upper case and a supporting seat for supporting the stator core, the upper case and the heat sink are snap-fitted together and defining a receiving space therebetween for receiving the control module, and the supporting seat is mounted on the upper case.

8. The motor according to claim 1, wherein the motor is an outer rotor permanent magnet motor, the stator comprises a stator seat, a stator core mounted to the stator seat, and stator windings wound around the stator core; the rotor comprises a rotating shaft rotatably mounted to the stator seat, a rotor housing having a cup shape fixed to the rotating shaft, and permanent magnets fixed to an inner wall of the rotor housing; an annular side wall of the rotor housing surrounds the stator core, and the permanent magnets are mounted to an inner surface of the annular side wall.

9. An engine cooling module comprising a motor according to claim 1, a frame and an impeller, the motor being mounted to the frame for driving the impeller.

10. A motor comprising a stator, the stator comprising a control module and a heat sink, the control module comprising a circuit board and a plurality of heat generating electronic components mounted on a top surface of the circuit board, wherein a plurality of ceramic heat conducting members is embedded inside the circuit board at positions facing the plurality of heat generating electronic components, and the heat sink is attached on a bottom surface of the circuit board, wherein the motor is an outer rotor permanent magnet motor, the stator comprises a stator seat, a stator core mounted to the stator seat, and stator windings wound around the stator core; the rotor comprises a rotating shaft rotatably mounted to the stator seat, a rotor housing having a cup shape fixed to the rotating shaft, and permanent magnets fixed to an inner wall of the rotor housing; an annular side wall of the rotor housing surrounds the stator core, and the permanent magnets are mounted to an inner surface of the annular side wall.

\* \* \* \* \*